US008850474B2

(12) United States Patent
Azam et al.

(10) Patent No.: US 8,850,474 B2
(45) Date of Patent: Sep. 30, 2014

(54) VIRTUAL CONTENT STORE IN INTERACTIVE SERVICES ARCHITECTURE

(75) Inventors: Khalid Mohammed Azam, Fremont, CA (US); Neeraj Kumar Sharma, Fremont, CA (US); Gary Ward Richardson, Pleasanton, CA (US); Daniel Michael Kiewlich, Burlingame, CA (US); Hoi-Tauw Jozef Chou, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 491 days.

(21) Appl. No.: 12/843,545

(22) Filed: Jul. 26, 2010

(65) Prior Publication Data

US 2012/0023529 A1   Jan. 26, 2012

(51) Int. Cl.
*H04N 7/10* (2006.01)
*H04N 7/18* (2006.01)
*H04N 7/173* (2011.01)
*H04N 21/472* (2011.01)
*H04N 21/239* (2011.01)
*H04N 21/231* (2011.01)
*H04N 21/222* (2011.01)

(52) U.S. Cl.
CPC ..... *H04N 21/2393* (2013.01); *H04N 21/47202* (2013.01); *H04N 21/23113* (2013.01); *H04N 21/2221* (2013.01)

USPC ............... 725/36; 725/82; 725/86; 725/87; 725/91; 725/93

(58) Field of Classification Search
CPC combination set(s) only.
See application file for complete search history.

(56) References Cited

U.S. PATENT DOCUMENTS

| 6,577,716 | B1 * | 6/2003 | Minter et al. | 379/101.01 |
| 8,122,477 | B1 * | 2/2012 | Stepanian | 725/91 |
| 2001/0042058 | A1 * | 11/2001 | Harrington et al. | 707/1 |
| 2002/0169656 | A1 * | 11/2002 | Al-Azzawe | 705/10 |
| 2002/0199188 | A1 * | 12/2002 | Sie et al. | 725/35 |
| 2003/0204856 | A1 * | 10/2003 | Buxton | 725/120 |
| 2006/0122938 | A1 * | 6/2006 | Hicks et al. | 705/59 |
| 2007/0124416 | A1 * | 5/2007 | Casey et al. | 709/217 |

* cited by examiner

*Primary Examiner* — Pankaj Kumar
*Assistant Examiner* — Franklin Andramuno
(74) *Attorney, Agent, or Firm* — Merchant & Gould

(57) ABSTRACT

A virtual content store may be provided. Upon receiving a request for a content stream from a subscriber at a regional headend, a central content vault may be examined to determine whether the content stream is available. Once the content stream is determined to be available in the central content vault, a streaming session may be established to the subscriber from the regional headend. The content stream may be retrieved from the central content vault and provided to the subscriber via the streaming session.

20 Claims, 3 Drawing Sheets

VIRTUAL CONTENT STORE IN INTERACTIVE SERVICES ARCHITECTURE

BACKGROUND

A virtual content store in an Interactive Services Architecture provides a method and system for consolidating resources in a central storage facility while maintaining operational consistency. Further, the virtual content store maintains adherence to the Interactive Services Architecture (ISA) standard as defined by the ISA 1.4 Specification, which is hereby incorporated by reference in its entirety. In conventional systems, content provider networks often have to use multiple content stores that are geographically proximate to their service areas. For example, content stores that each maintain copies of all available content may need to be available for every 10,000 subscribers. This results in an inefficient and duplicative use of storage resources.

BRIEF DESCRIPTION OF THE DRAWINGS

The accompanying drawings, which are incorporated in and constitute a part of this disclosure, illustrate various embodiments of the present invention. In the drawings.

DESCRIPTION OF EXAMPLE EMBODIMENTS

Overview

Figure 1:
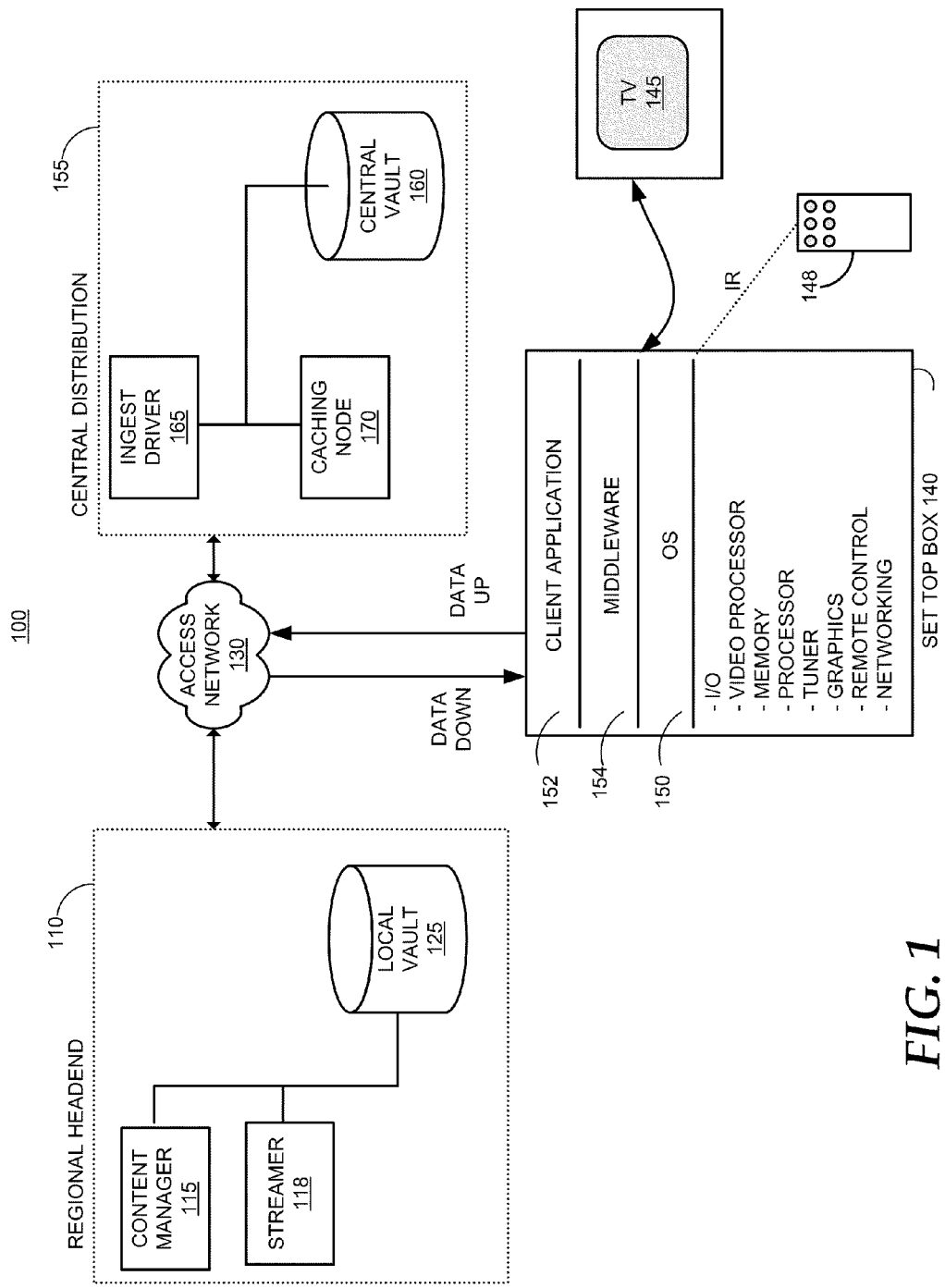
FIG. 1 is a block diagram of a cable television network.

Consistent with embodiments of the present invention, systems and methods are disclosed for providing a virtual content store. Upon receiving a request for a content stream from a subscriber and/or headend, a central content vault may be examined to determine whether the content stream is available. Once the content stream is determined to be available in the central content vault, a streaming session may be established to the subscriber from the regional headend. The content stream may be retrieved from the central content vault and/or an intermediate caching node. If the content is retrieved in response to a subscriber request, the content may be provided to the subscriber via the streaming session.

It is to be understood that both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Current content distribution implementations often result in multiple independent nodes with each node replicating the work effort and the hardware required to deliver Video on Demand (VOD) content to digital Set Top Boxes (STBs). Building each of the nodes as an independent entity as a customer base expands is highly inefficient and expensive.

A virtual content store in an Interactive Services Architecture (ISA) may comprise a solution to deploy content distribution storage—a central vault—in a single location accessible by a large subscriber base through geographically dispersed regional distribution points. For example, the central vault may provide at least 30,000 standard definition equivalent (SDE) hours of content storage. The central vault may create streamer assets in cooperation with the regional distribution point in order to provide requested content from the central vault to a requesting subscriber. Consistent with embodiments of the invention, the regional distribution points may comprise local vaults for storing region-specific content and/or caching some live content to provide a Start Over feature. Such region-specific content may comprise, for example, a local news program and/or local sports team coverage. The Start Over feature may allow customers to jump to the beginning of a program in progress of a live broadcast without any preplanning or in-home recording devices.

FIG. 1 is a block diagram view of a cable television system (CTS) 100 comprising an integrated network system that features video, audio, voice and data services to audience members or set top box (STB) users. CTS 100 may comprise a headend 110 comprising a content manager 115, a streamer 118, and a local vault 125. Headend 110 may be communicatively coupled to an access network 130, such as a hybrid fiber coax (HFC) cable television network operative to transmit data to and/or from a client set top box (STB) 140. Local vault 125 may be operative to store local interest content and cached content for use with a Start Over feature.

Figure 3:
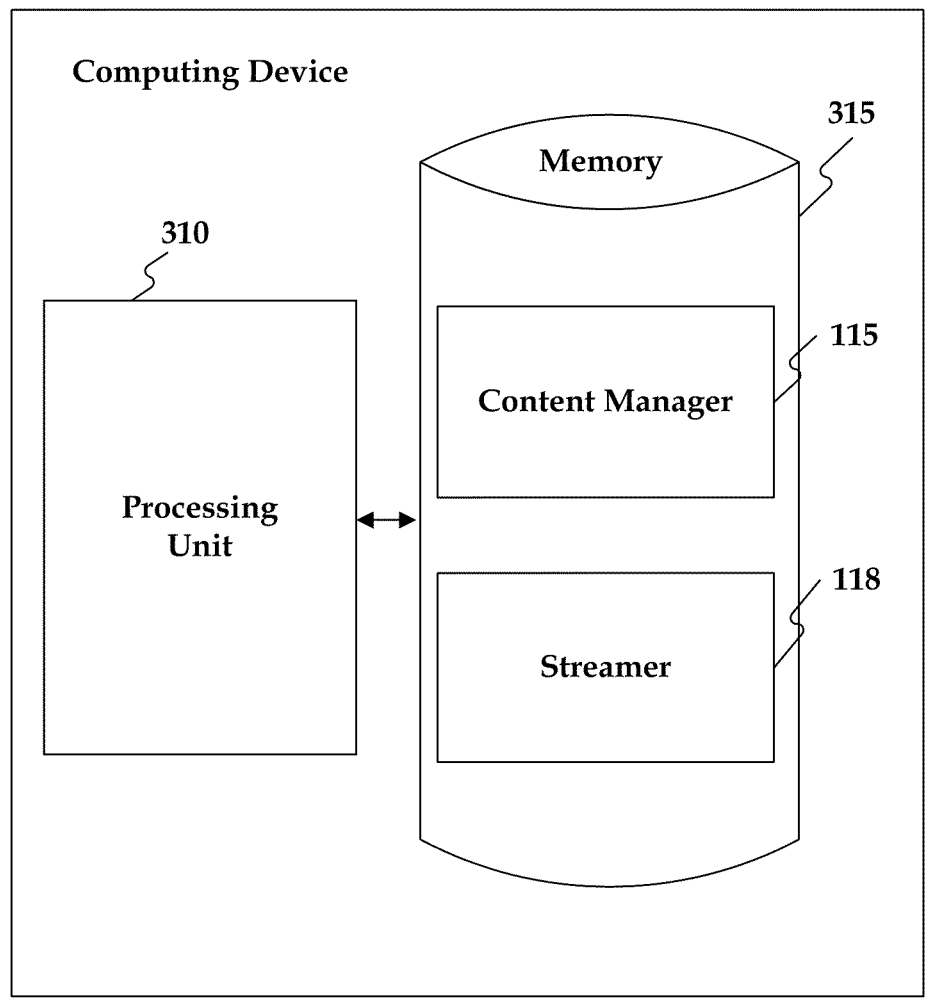
FIG. 3 is a block diagram of a computing device.

Digital and analog video programming and digital and analog data may be provided to a display device such as a television set 145 via set-top box (STB) 140 associated with a subscriber. Interactive television services that allow a customer to input data to CTS 100 may likewise be provided by STB 140. As illustrated in FIG. 3, STB 140 may comprise a multipurpose computing device having a computer processor, memory and an input/output mechanism. The input/output mechanism may receive input from server-side processes via access network 130 and from customers via input devices such as a remote control device 148. Remote control device 148 may communicate with STB 140 via a suitable communication transport such as an infrared connection. STB 140 may also include a video processor for processing and providing digital and analog video signaling to television set 145 via a cable communication transport. A multi-channel tuner may be provided for processing video and data to and from STB 140 and headend 110. STB 140 may also comprise an operating system 150 for directing the functions of STB 140 in conjunction with a variety of client applications.

Because a variety of different operating systems 150 may be utilized by a variety of different brands and types of set-top boxes, a middleware layer 154 may be provided to allow a given software application to be executed by a variety of different operating systems. According to embodiments of the present invention, middleware layer 154 may include a set of application programming interfaces (API) that are exposed to client application 152 and operating system 150 that allow client application 152 to communicate with operating system 150 through common data calls understood via the API set. A corresponding middleware layer may be included on the server side of CATV system 100 for facilitating communication between server-side content server 115 and client-side STB 140. In CTS 100, STB 140 may send a channel request signal back to headend 110. If a channel is not currently being transmitted on the coaxial line, a distribution hub may allocate a new QAM channel and transmit the new channel to the coaxial cable via a fiber optic node in access network 130.

CTS 100 may further comprise a central distribution node 155. Central distribution node 155 may comprise a central vault 160, an ingest driver 165, and a caching node 170. Central vault 160 may be operative to store a plurality of content streams that may be provided to regional distribution nodes, such as headend 110, and/or to subscribers via STB 140. Ingest driver 165 may be operative to contact content providers (not shown), request updates to available content, and retrieve content from the content providers for storage in central vault 160 on an automatic basis and/or upon receiving a request from headend 110 and/or STB 140.

An ingest driver client may operate in association with local vault 125 while ingest driver 165 operates in association with central vault 160. Ingest driver 165 may be operative to scan the contents of central vault 160 and distribute a list of available content to each of a plurality of regional distribution nodes, such as regional headend 110. The distribution list may comprise, for example, an XML file comprising details about each program such as an index code for locating the content in central vault 160, pricing information, title, description, file size, format, bit rate, etc. The distribution list may be transmitted in the XML format through an HTTP communication. When the ingest driver client requests downloading of a content which has not been previously ingested, ingest driver 165 may create a record in a database for that content with an initial reference count of 1. Subsequent ingest requests by other regional distribution nodes may result in the reference count for that content being incremented and updated/stored in the database record. Likewise, deletion requests from the regional distribution nodes may result in decrementing the reference count associated with the record. When the reference count reaches 0, ingest driver 165 may delete the content.

Caching node 170 may comprise a streamer service that may provide a communication interface between central vault 160 and streamer 118. Streamer 118 may be configured to contact caching node 170 instead of and/or before contacting central vault 160 to retrieve the requested content. Caching node 170 may retrieve that content from the central vault 160 and provide it to streamer 118. Caching node 170 may be used when CTS 100 comprises a geographically dispersed subscriber base, such as a multi-state region. In such a case, caching node 170 may be used to alleviate traffic congestion between numerous regional streamers, such as streamer 118, and central vault 160 for retrieval/playing of content. Caching node 170 may mitigate this problem by retrieving single copies of popular content and serving them to multiple streamers requesting it within its region. Caching node 170 may thus reduce traffic between the large numbers of individual streamers and central distribution node 155.

CTS 100 may deliver broadcast video signals as digitally formatted signals in addition to delivering traditional broadcast analog video signals. Furthermore, CTS 100 may support one-way broadcast services as well as both one-way data services and two-way media and data services. The two-way operation of the network may allow for user interactivity with services, such as Pay-Per-View programming, Near Video-On-Demand (NVOD) programming, Video-on-Demand (VOD) programming, and interactive applications, such as Internet connections and interactive services that render real-time bi-directional communication on a personalized basis such as bi-directional audio-visual communication. CTS 100 may also provide interfaces, network control, transport control, session control, and servers to access content and services, and may distribute content and services to STT users. CTS 100 may also provide the interfaces, network control, transport control, session control, and servers to establish on-demand session-based bi-directional communication service between a particular remote destination and a STT user for delivering media from the particular remote destination to the STT user and input information from the STT user to the particular remote destination. A remote destination during a session of a bi-directional communication service may comprise a remote personal destination such as a friend or a remote vendor that offers a bi-directional communication service for a purchasable period of time in which a viewer communicates real-time with the vendor on a personal basis. In either case, dedicated CTS 100 resources may be allocated to fulfill individualized bi-directional communication over a purchasable period.

Content manager 115 may comprise a virtual content store comprising a list of available content stored on local vault 125 and/or known to be available via the distribution list associated with central vault 160. Content manager 115 may be operative to generate requests for content, such as new release movies to provide to video on demand subscribers. The content requests may be generated automatically, such as by scheduling periodic requests for programs from a particular content provider and/or may be individual requests generated by an operator at headend 110. Headend 110 may be configured so that requests to ingest and/or delete content may be based on licensing windows, rental windows, user purchase of content, etc.

A request may first determine whether the content is available, such as in local vault 125 and/or central vault 160. If the content is available, on central vault 160 for example, a reference count associated with the content may be incremented. Otherwise, ingest driver 165 may download the requested content for storage in central vault 160.

Ingest driver 165 may provide a communication proxy to an ingest driver client associated with content manager 115 that may be transparent to the standard ISA communication protocol. This may allow regional sites, such as headend 110, to stream content from central distribution node 165 without disruption to the streaming sessions should a failure requiring a switch to a new streaming source (e.g., a backup vault) occur. Further, the regional sites may be able to set up their own networks without requiring a central domain name server (DNS) as is conventionally needed for in an ISA-compliant setup.

Content manager 115 may also be operative to receive requests for content from a subscriber, such as standard programming and/or video on demand content and configure streamer 118 to transmit the content to the requesting subscriber.

Upon receiving a content request from STB 140, content manager 115 may be operative to determine whether the requested content is stored in local vault 125 and/or central vault 160. If the content is not stored in either, content manager 115 may request that the content be ingested, if available. For example, content manager 115 may request that ingest driver 165 retrieve the content from a content provider and store it in central vault 160. Streamer 118 may then establish a transmission of the content to STB 140 from central vault 160.

Figure 2:
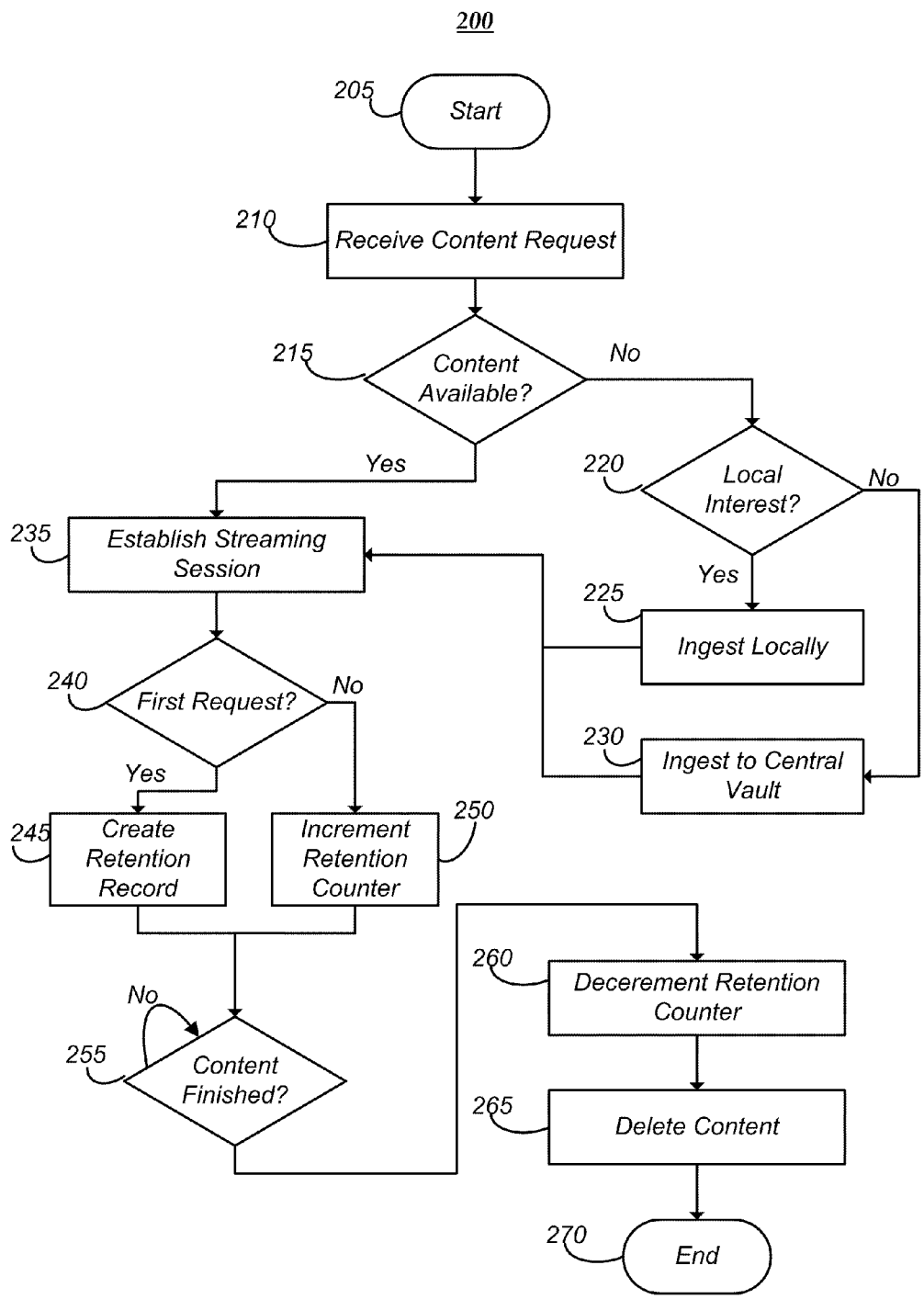
FIG. 2 is a flow chart of a method for providing a virtual content store.

FIG. 2 is a flow chart setting forth the general stages involved in a method 200 consistent with embodiments of the invention for providing a virtual content store. Method 200 may be implemented using a computing device 300 as described in more detail below with respect to FIG. 3. Ways to implement the stages of method 200 will be described in greater detail below. Method 200 may begin at starting block 205 and proceed to stage 210 where computing device 300 may receive a content request. For example headend 110 may receive a request for a Video on Demand content stream from STB 140 over access network 130. For another example, headend 110 may generate a request for a program's content stream and transmit the request to central distribution node 155.

From stage 210, method 200 may advance to stage 215 where computing device 300 may determine whether the requested content is available. For example, content manager 115 may determine whether the content is stored and/or cached in local vault 125 and/or may refer to a list of content available in central vault 160. The content list may comprise, for example, an XML formatted list of content stored in central vault 160 created by ingest driver 165. The list may be retrieved by and/or distributed to a plurality of regional headends, including headend 110, each of which may request access to content stored in central vault 160.

If the content is determined not to be currently available at stage 215, method 200 may advance to stage 220 where computing device 300 may determine whether the content comprises a local interest content stream. For example, headend 110 may comprise a list of categories of content that are unlikely to be requested by users accessing content through other regional headends such as local news, local public access, and local sports team coverage.

If the content is determined to be of local interest, method 200 may advance to stage 225 where computing device 300 may ingest the content locally. For example, content manager 115 may contact a provider of the requested content (e.g., a local news station) and download the content to local vault 125.

Otherwise, method 200 may advance to stage 230 where computing device 300 may cause the content to be ingested at a vault accessible to multiple headends. For example, regional headend 110 may send a request to central distribution node 155 to retrieve and store the requested content. Ingest driver 165 may receive the request, contact a provider of the requested content, such as a movie distributor, retrieve the content and/or a corresponding license, and store the content in central vault 160. The license may comprise details such as a duration that the content may be retained in central vault 160.

After ingesting the content, either locally at stage 225 or centrally at stage 230, or if the content was already determined to be available at stage 215, method 200 may advance to stage 235 where computing device 300 may establish a streaming session. For example, streamer 118 may retrieve the content from central vault 160 and/or caching node 170, allocate a QAM channel for providing the content to STB 140, and inform STB 140 which channel should be tuned to receive and display the content on television 145. Regional headend 110 may also determine appropriate pricing to be charged to a subscriber associated with STB 140 and track such charges in a billing system (not shown). The pricing information may be included, for example, in the content list provided by ingest driver 165.

From stage 235, method 200 may advance to stage 240 where computing device 300 may determine whether the content request comprises a first request for the content. For example, central vault 160 may periodically download content from content providers that has not been requested by a subscriber. This content may be maintained until space is needed, a license expires, or other business logic dictates that the content may be deleted.

If, at stage 240, computing device 300 determines that the content request does comprise the first request, computing device 300 may create a retention record associated with the content. The retention record may comprise a counter initialized to "1", for the one subscriber currently receiving the streamed content. Otherwise, computing device 300 may increment the counter in the retention record associated with the content for each additional viewer. The retention record may be stored at regional headend 110 and/or central distribution node 155. Consistent with embodiments of the invention, each of a plurality of regional headends may be operative to maintain their own retention records and/or may be operative to request the creation and/or update of retention records at central distribution node 155. Further consistent with embodiments of the invention, retention records may be created as content is ingested at stage 225 and/or stage 230. For example, the retention record may be created with the counter initialized to zero when content is ingested without a specific subscriber request for the content being received.

From stage 245 and/or stage 250, method 200 may advance to stage 255 where computing device 300 may determine whether the content has finished streaming. While the content continues streaming to STB 140, method 200 may remain in stage 255. Consistent with embodiments of the invention, method 200 may remain in stage 255 if the subscriber pauses playback and/or turns off STB 140 if the content has not been finished. Further consistent with embodiments of the invention, method 200 may remain in stage 255 after the streaming session to STB 140 has been completed if the subscriber's request for the content comprises a requested duration. For example, the request may comprise a purchase of video on demand content to which the subscriber will have access for 24 hours; the subscriber may re-watch the content multiple times during that duration. Streamer 118 may establish a new streaming session for each repeat viewing and/or after an interruption in viewing without re-incrementing the counter in the retention record.

Once the content streaming has finished, method 200 may advance to stage 260 where computing device 300 may decrement the retention counter. For example, regional headend 110 may inform central distribution node 155 that the content is no longer needed by the subscriber and the counter in the retention record may be decremented.

From stage 260, method 200 may advance to stage 265 where computing device 300 may delete the content. For example, when a content's retention record reaches zero, the content may be deleted from local vault 125 and/or central vault 160. Content deletion may occur according to one and/or more business logic rules. For example, content may be retained as long as the retention record's counter is greater than zero, as long as a license associated with the content allows, and/or until space is needed on the vault. Consistent with embodiments of the invention, content with a "zero" counter may be deleted to free up available space before the license has expired. Method 200 may then end at stage 270.

An embodiment consistent with the invention may comprise a system for providing a virtual content store. The system may comprise a memory storage and a processing unit coupled to the memory storage. The processing unit may be operative to receive a request for a content stream from a subscriber or a regional distribution node, determine whether the content stream is available from a central content vault, and in response to determining that the content stream is available from the central content vault, establish a streaming session to the subscriber and provide the requested content stream to the subscriber from the central content vault via the streaming session. In response to determining that the content stream is not available from the central content vault, the processing unit may be operative to determine whether the content stream comprises a local interest content stream and, if so, establish the streaming session to the subscriber from the regional headend and provide the requested content stream to the subscriber from a local content vault via the streaming session.

The processing unit may be further operative to determine whether the request for the content stream comprises a first request for the content stream and, if so, create a retention record comprising a counter associated with the content stream. If not, the processing unit may increment the counter of the retention record associated with the content stream. In response to determining that the streaming session has been completed, the processing unit may be operative to decrement the counter of the retention record associated with the content stream. If the counter of the retention record associated with the content stream indicates that the content stream is not associated with an active streaming session and/or that a license associated with the content stream has expired, the processing unit may be operative to delete the content stream.

Another embodiment consistent with the invention may comprise a system for providing a virtual content store. The system may comprise a memory storage and a processing unit coupled to the memory storage. The processing unit may be operative to receive a request over a network from a regional headend for a content stream to be transmitted to a subscriber, determine whether the content stream is available on a central content vault, in response to determining that the content stream is available on the central content vault, establish a transmission session between the central content vault and the regional headend, and provide the content stream to the regional headend for transmission to the subscriber via the transmission session. The processing unit may be further operative to receive a plurality of requests from a plurality of regional headends. In response to determining that the content stream is not available on the central content vault, the processing unit may be operative to determine whether the content stream is available from a content stream provider and, in response to determining that the content stream is available from the content stream provider, ingest the content stream to the central content vault. The processing unit may be further operative to establish a deletion date for the ingested content stream according to a license agreement with the content stream provider.

Yet another embodiment consistent with the invention may comprise a system for providing a virtual content store. The system may comprise a memory storage and a processing unit coupled to the memory storage. The processing unit may be operative to receive a request from at least one of a plurality of regional headends for a content stream to be transmitted to a subscriber, determine whether the content stream is available from a central content vault, and, in response to determining that the content stream is not available from the central content vault, ingest the content stream to the central content vault from a content provider and create a retention record associated with the content stream, wherein the retention record comprises a viewer counter and a license expiration date. The processing unit may be further operative to increment the viewer counter associated with the retention record associated with the content stream and transmit the content stream from the central content vault to the subscriber via a streaming session established between the at least one of the regional headends and the subscriber. The processing unit may be further operative to determine whether the subscriber is no longer receiving the content stream and, in response to determining that the subscriber is no longer receiving the content stream, decrement the viewer counter associated with the retention record associated with the content stream. The processing unit may be further operative to download a plurality of available content streams from the content provider to the central content vault on a periodic basis and create a retention record associated with each of the plurality of available content streams.

FIG. 3 illustrates a computing device 300. Computing device 300 may include a processing unit 310 and a memory unit 320. Memory 320 may include software configured to execute application modules such as content manager 115 and/or streamer 118. Computing device 300 may execute, for example, one or more stages included in method 300 as described above with respect to FIG. 3. Moreover, any one or more of the stages included in method 300 may be performed on any element shown in FIG. 1.

Computing device 300 may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing a virtual content store, the method comprising:

receiving a request for a content stream at a regional headend;

determining, by the regional headend, whether the content stream is available in a local content vault at the regional headend;

determining, in response to the content stream not being available in the local content vault, by the regional headend, whether the content stream is available from a central content vault, wherein determining whether the content stream is available from the central content vault comprises determining whether the content stream is available in a content list, wherein the content list is created by an ingest driver at the central vault and distributed to each of a plurality of regional headends associated with the central vault; and in response to determining that the content stream is not available from the central content vault, determining, by the regional headend, whether the content stream is a local interest content stream, wherein determining whether the content stream is a local stream comprises checking a list of categories of content streams that are unlikely to be requested by users associated with other regional headends;

ingesting, in response to the determination that the content stream being the local interest content stream, the content stream at the local content vault at the regional headend;

incrementing a retention counter associated with the content stream;

establishing a streaming session to a subscriber; and providing the requested content stream to the subscriber via the streaming session.

2. The method of claim 1, wherein the streaming session is established by the regional headend.

3. The method of claim 1, wherein the regional headend comprises one of the plurality of regional headends and wherein each of the plurality of regional headends are communicatively coupled to the central content vault via a network.

4. The method of claim 3, wherein the network comprises a hybrid fibre coaxial (HFC) network.

5. The method of claim 3, further comprising:

determining whether the request for the content stream comprises a first request for the content stream; and in response to determining that the request for the content stream comprises the first request for the content stream, creating a retention record comprising the retention counter associated with the content stream.

6. The method of claim 5, further comprising:

determining whether the streaming session has been completed; and in response to determining that the streaming session has been completed, decrementing the retention counter of the retention record associated with the content stream.

7. The method of claim 6, further comprising:

determining whether the retention counter of the retention record associated with the content stream indicates that the content stream is not associated with an active streaming session; and in response to determining that the counter of the retention record associated with the content stream indicates that the content stream is not associated with the active streaming session, deleting the content stream.

8. The method of claim 6, further comprising:

determining whether a license associated with the content stream has expired; and in response to determining that the license associated with the content stream has expired, deleting the content stream.

9. The method of claim 8, further comprising:

in response to determining that the license associated with the content stream has expired, determining whether the retention counter of the retention record associated with the content stream indicates that the content stream is not associated with the active streaming session; and in response to determining that the counter of the retention record associated with the content stream indicates that the content stream is associated with the active streaming session, retaining the content stream.

10. The method of claim 1, wherein the request for the content stream is received from at least one of the following: the subscriber and the regional headend.

11. A system for providing a virtual content store, the system comprising:

a memory; and a processor coupled to the memory, wherein the processor is operative to:

receive a request over a network at a regional headend for a content stream to be transmitted to a subscriber, determine whether the content stream is available on a local vault at the regional headend, determine, in response to the content not being available on the local vault, whether the content stream is available on a central content vault, wherein determining whether the content stream is available on the central content vault comprises determining whether the content stream is available in a content list, wherein the content list created by an ingest driver at the central vault and distributed to a plurality of regional headends, in response to determining that the content stream is not available on the central content vault, determining, by the regional headend, whether the content stream is a local interest content stream, wherein determining whether the content stream is a local stream comprises checking a list of categories of content streams that are unlikely to be requested by users associated with other regional headends, ingesting, in response to the determination that the content stream being the local interest content stream, the content stream at the local content vault at the regional headend, provide the content stream to the regional headend for transmission to the subscriber via the transmission session, and establish a deletion date for the ingested content stream according to a license agreement with the content stream provider.

12. The system of claim 11, wherein the processor is further operative to:
in response to determining that the content stream is not available on the central content vault and in response to the determination that the content stream does not comprises the local interest content stream, ingest the content stream to the central content vault.

13. A method for providing a virtual content store, the method comprising:
receiving, at a regional headend, a request for a content stream to be transmitted to a subscriber;
determining, by the regional headend, whether the content stream is available from a central content vault, wherein determining comprises determining whether the content stream is available in a content list, and wherein the content list created by an ingest driver at the central vault and distributed to a plurality of regional headends;
in response to determining that the content stream is not available from the central content vault:
determining, by the regional headend, whether the content stream is a local interest content stream, wherein determining whether the content stream is a local stream comprises checking a list of categories of content streams that are unlikely to be requested by users associated with other of the plurality of regional headends,
ingesting, in response to the determination that the content stream being the local interest content stream, the content stream at the local content vault at the regional headend,
ingesting, in response to the determination that the content stream being the local interest content stream, the content stream to a local content vault associated with the regional headend from a content provider, and
creating a retention record associated with the content stream, wherein the retention record comprises a viewer counter, a reference count, and a license expiration date;
establishing a deletion date for the content stream corresponding to the license expiration date;
incrementing the viewer counter associated with the retention record associated with the content stream;
transmitting the content stream from the local content vault to the subscriber via a streaming session established between the regional headend and the subscriber; and
deleting the content stream when the deletion date is reached or the viewer counter reaches the reference count, whichever occurs first.

14. The method of claim 13, further comprising:
determining whether the subscriber is no longer receiving the content stream; and
in response to determining that the subscriber is no longer receiving the content stream, decrementing the viewer counter associated with the retention record associated with the content stream.

15. The method of claim 13, wherein the content stream comprises a video on demand stream.

16. The method of claim 13, further comprising:
downloading a plurality of available content streams from the content provider to the central content vault on a periodic basis; and
creating the retention record associated with each of the plurality of available content streams.

17. The system of claim 11, wherein the processor if further operative to:
create a retention record comprising a retention counter associated with the content stream and an expiry date of the license agreement, and
increment the retention counter at initiation of the transmission session.

18. The system of claim 17, wherein the processor if further operative to:
determine whether the transmission session has been completed; and
in response to determining that the transmission session has been completed, decrementing the retention counter of the retention record associated with the content stream.

19. The system of claim 18, wherein the processor if further operative to:
determine whether the retention counter of the retention record associated with the content stream indicates that the content stream is not associated with an active streaming session; and
in response to determining that the counter of the retention record associated with the content stream indicates that the content stream is not associated with the active streaming session, deleting the content stream.

20. The system of claim 18, wherein the processor if further operative to:
determine whether the retention counter of the retention record associated with the content stream indicates that the content stream is not associated with an active streaming session; and
delete the content stream when the deletion date is reached or the viewer counter reaches the reference count, whichever occurs first.

* * * * *